(12) United States Patent
Larsson et al.

(10) Patent No.: US 6,535,498 B1
(45) Date of Patent: Mar. 18, 2003

(54) ROUTE UPDATING IN AD-HOC NETWORKS

(75) Inventors: Tony Larsson, Stockholm (SE); Per Johansson, Hägersten (SE); Johan Sörensen, Eslöv (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/455,168

(22) Filed: Dec. 6, 1999

(51) Int. Cl.$^7$ .................................................. H04Q 7/24
(52) U.S. Cl. ..................... 370/338; 370/254; 370/351
(58) Field of Search ............................... 370/218, 229, 370/230, 231, 235, 237, 241.1, 242, 252, 254, 285, 338, 355, 356, 351

(56) References Cited

U.S. PATENT DOCUMENTS

| | | | |
|---|---|---|---|
| 5,051,984 A | | 9/1991 | Mostafa et al. |
| 5,056,085 A | | 10/1991 | Vu |
| 5,065,399 A | | 11/1991 | Hasegawa et al. |
| 5,173,689 A | | 12/1992 | Kusano |
| 5,235,599 A | | 8/1993 | Nishimura et al. |
| 5,412,654 A | * | 5/1995 | Perkins ........................ 370/312 |
| 5,572,528 A | * | 11/1996 | Shuen ......................... 370/338 |
| 5,719,861 A | | 2/1998 | Okanoue |
| 5,740,366 A | | 4/1998 | Mahany et al. |
| 5,748,611 A | | 5/1998 | Allen et al. |
| 5,822,309 A | * | 10/1998 | Ayanoglu et al. ............ 370/315 |
| 5,987,011 A | * | 11/1999 | Toh ............................. 370/255 |
| 6,049,524 A | * | 4/2000 | Fukushima et al. ......... 370/220 |
| 6,130,881 A | * | 10/2000 | Stiller et al. ................. 370/238 |
| 6,304,556 B1 | * | 10/2001 | Haas ........................... 370/238 |
| 6,400,752 B1 | * | 6/2002 | Suzuki et al. ............... 370/335 |

FOREIGN PATENT DOCUMENTS

| | | |
|---|---|---|
| EP | 0599764 | 6/1994 |
| EP | 0883265 | 12/1998 |
| EP | 0913965 | 5/1999 |
| WO | 9911025 | 3/1999 |
| WO | 9923799 | 5/1999 |

OTHER PUBLICATIONS

Albrecht, M.,et al., "IP Services over Bluetooth: Leading the Way to a New Mobility", Proceedings of the Conference on Local Computer Networks, Oct. 1999.
Tode, H., et al., "A Routing Method Using a Tunable Cost Function to Obtain Required Communication Quality and Performance", Electronics and Communications in Japan, Part 1, vol., 81, No. 5, 1998.
Haartsen, J., "Bluetooth—The Universal Radio Interface for Ad Hoc, Wireless Connectivity", Ericsson Review No. 3 (1998), pp. 110–117.
Takagi, Hideaki, "Queuing Analysis of Polling Models", ACM Computing Surveys, vol. 20, No. 1, Mar. 1988.
Johansson, Per, et al., "Short Range Radio Based Ad–hoc Networking: Performance and Properties", Proceedings of International Conference on Communications (ICC '99), Jun. 6–10, 1999.
"Specification of the Bluetooth System", Bluetooth SIG, vol. 0, pp. 35–40 and 121–122; Jul. 24, 1999.

* cited by examiner

*Primary Examiner*—Nay Maung
*Assistant Examiner*—Jean A Gelin
(74) *Attorney, Agent, or Firm*—Burns, Doane, Swecker & Mathis, L.L.P.

(57) ABSTRACT

In conventional ad-hoc networks using reactive routing protocols the route between the source node and the destination node is not updated until the route is actually broken. In response to predetermined events a request for updated route message can be sent to the destination node to determine if another route exists between the source node and the destination node. A reply to the request for updated route can be provided by either the destination node or by a node which has a cached route between the source node and the destination node. This updated route request scheme can be implemented in networks which use source routing and networks which use distance vector routing.

28 Claims, 6 Drawing Sheets

ROUTE UPDATING IN AD-HOC NETWORKS

CROSS-REFERENCE TO RELATED APPLICATIONS

This application is related to the following co-pending applications: U.S. Provisional Application No. 60/168,742 "Route Discovery Based Piconet Forming"; U.S. patent application Ser. No. 09/455, 460 "Broadcast As A Triggering Mechanism For Route Discovery In Ad-Hoc Networks"; U.S. patent application Ser. No. 09/454, 758 "Inter Piconet Scheduling"; and U.S. patent application Ser. No. 09/455, 172 "Batched Fair Exhaustive Polling Scheduler", all of which are herein expressly incorporated by reference.

BACKGROUND

The present invention relates to routing in ad hoc networks. More particularly, the present invention relates to route updating in ad hoc networks.

Conventional networking protocols are based on the characteristics and/or features of fixed networks. In fixed networks, the network configuration typically does not change. Although nodes can be added and removed in fixed networks, the route traveled by data packets between two nodes typically does not change. The disadvantage is that fixed networks cannot be easily reconfigured to account for increases in data traffic, also called system loading. Accordingly, when system loading increases for one node, the surrounding nodes are likely to experience increased delays in the transmission and reception of data.

In contrast to fixed networks, ad-hoc networks are dynamic. An ad-hoc network is formed when a number of nodes decide to join together to form a network. Since nodes in ad-hoc networks operate as both hosts and routers, ad-hoc networks do not require the infrastructure required by fixed networks. Accordingly, ad-hoc networking protocols are based upon the assumption that nodes may not always be located at the same physical location.

Bluetooth is an exemplary ad-hoc networking technology. Bluetooth is an open specification for wireless communication of both voice and data. It is based on a short-range, universal radio link, and it provides a mechanism to form small ad-hoc groupings of connected devices, without a fixed network infrastructure, including such devices as printers, PDAs, desktop computers, FAX machines, keyboards, joysticks, telephones or virtually any digital device. Bluetooth operates in the unlicenced 2.4 GHz Industrial-Scientific-Medical (ISM) band.

Figure 1:
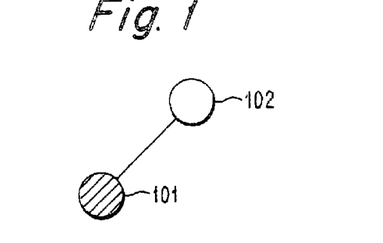
FIG. 1 illustrates an exemplary piconet.

FIG. 1 illustrates a Bluetooth piconet. A piconet is a collection of digital devices, such as any of those mentioned above, connected using Bluetooth technology in an ad-hoc fashion. A piconet is initially formed with two connected devices, herein referred to as Bluetooth devices. A piconet can include up to eight Bluetooth devices. In each piconet, for example piconet 100, there exists one master Bluetooth unit and one or more slave Bluetooth units. In FIG. 1 Bluetooth unit 101 is a master unit and unit 102 is a Bluetooth slave unit.

Figure 2:
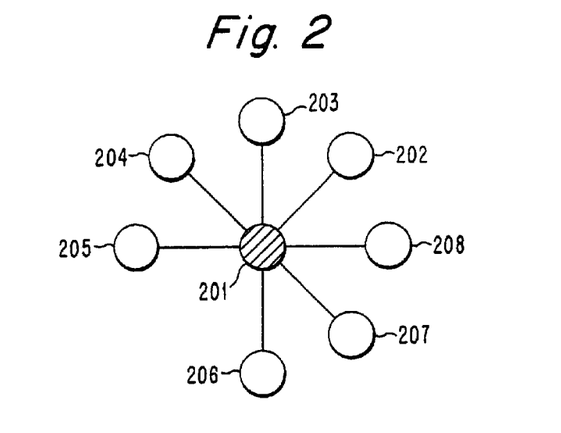
FIG. 2 illustrates an exemplary star-topology network.

According to Bluetooth technology a slave unit can only communicate directly with a master unit. FIG. 2 illustrates a piconet with a master unit 201 and a plurality of slave units 202–208 arranged in a star network topology. If slave unit 202 wishes to communicate with slave unit 206, slave unit 202 would have to transmit the information it wished to communicate to master unit 201. Master unit 201 would then transmit the information to slave unit 206.

Figure 3:
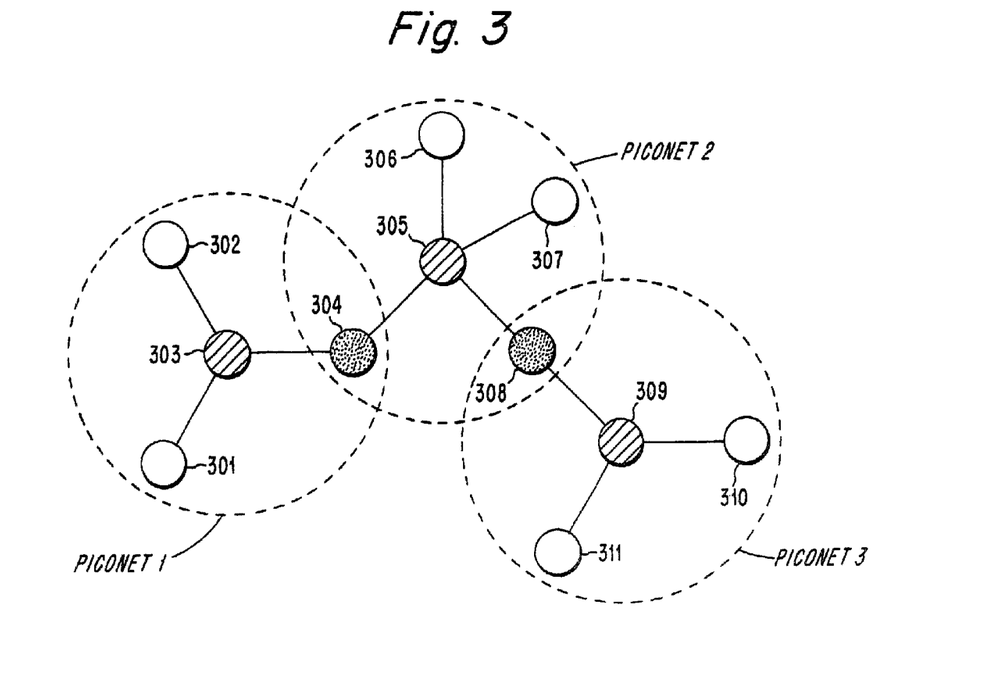
FIG. 3 illustrates an exemplary scatternet formed by a plurality of piconets.

A scatternet is formed by multiple independent and unsynchronized piconets. FIG. 3 illustrates an exemplary scatternet 300. In FIG. 3, piconet 1 includes a master node 303 and the slave nodes 301, 302 and 304; piconet 2 includes the master node 305 and the slave nodes 304, 306, 307 and 308; and piconet 3 includes the master node 309 and the slave nodes 308, 310 and 311. To implement a scatternet it is necessary to use nodes which are members of more than one piconet. Such nodes are herein referred to as forwarding nodes. If, for example, node 301 wishes to communicate with node 310, then nodes 304 and 308 might act as forwarding nodes by forwarding the packets between the two piconets and in particular between nodes 301 and 310. For example, node 301 transfers the information to the master node of piconet 1, node 303. Master node 303 transmits the information to forwarding node 304. Forwarding node 304 then forwards the information to master node 305, which in turn, transmits the information to forwarding node 308. Forwarding node 308 forwards the information to master node 309 which transmits the information to destination node 310.

In general, the protocols which govern the formation and/or updating of routes in an ad-hoc network may be classified as either proactive or reactive. Proactive routing protocols attempt to update and maintain routes between nodes, including routes which are not currently in use. Typically, proactive routing protocols react to network topology changes, even if there is no current traffic which is affected by the topology change. To update and maintain the routes between nodes in an ad-hoc network employing proactive routing, each node periodically transmits control information to other nodes in the network. However, this requires a large amount of signaling, which consumes precious bandwidth and leads to network congestion. The network congestion, in turn, results in greater transmission delays for packets traveling through the network.

In contrast to proactive routing protocols, reactive routing protocols establish routes only when there is an immediate need to transmit packets. Moreover, reactive routing protocols only maintain information about routes which are currently being used for transmitting data packets. Accordingly, reactive protocols result in less network signaling, and hence, less network congestion and less delay due to the congestion as compared to proactive routing protocols.

To establish a route from a source node to a destination node using reactive protocols, a request message is transmitted from the source node to the destination node. Initially, the source broadcasts the request message to all neighboring nodes, i.e., all nodes adjacent to the source node. If a neighbor node receiving the request message is neither the destination node nor has a valid route to the destination node, the neighbor node rebroadcasts the request message to all of its neighbor nodes, excluding the node from which it received the request message. In a network which operates using reactive routing protocols, a neighbor node may have a valid route to the destination cached in a routing table if the neighbor node is routing data packets to the destination node for another source node.

The destination node, or a node with a valid cached route to the destination node upon receiving the request message, does not rebroadcast the request message. This limits the amount of network flooding caused by the rebroadcasting of the request message. Additionally, the destination node generates a unicast reply message and transmits the reply message back to the source node. Although the source node may receive more than one reply message, the source node uses the first reply message received to begin transmitting data packets to the destination node. In accordance with reactive routing, the source node will only request a new route when the actual route being used is broken.

Routing in ad-hoc networks can be performed as either source routing or distance vector routing. In source routing an entire route from the source node to the destination node is received in the reply message. Accordingly, only the source needs to keep track of the route between the source node and the destination node. When packets are sent from the source node to the destination node the entire route is specified in every packet.

In distance vector routing as the reply message is sent from the destination node to the source node each intermediate node stores route information in routing tables. Accordingly, the source node will only need to place the destination node address in each packet for the packet to reach the destination node.

There are several drawbacks of conventional reactive ad-hoc routing protocols, especially in regard to wireless ad-hoc networks such as Bluetooth networks. Typically, once a source node has established a route to a destination node the source node will continue to use the same route until node movement causes changes in the network topology that cause the route between the source node and the destination node to break. Accordingly, the conventional reactive ad-hoc routing protocols do not adjust to topology changes which do not lead to an actual link breakage. For example, although there is a valid route between the source node and the destination node the route may not actually be the most optimal route in terms of the number of hops between the source and destination node and the delay caused by the number of hops. Further, conventional reactive ad-hoc routing protocols do not react to changes in traffic patterns. For instance, certain nodes along the route may end up handling a larger amount of traffic than when the route was first established. This increase in traffic along the route may result in dropped packets and higher delay between the source and destination nodes. In addition, even without changes in the network topology the initial route formed between the source node and the destination node may not be the most optimal route.

Accordingly, it would be desirable to allow reactive ad-hoc routing protocols to determine whether more optimal routes exist between the source node and the destination node. These routes may be more optimal than the original route in terms of fewer hops between the source node and the destination node or in terms of dropped packets and network delays along the original route.

SUMMARY

These and other problems, drawbacks and limitations of conventional techniques are overcome according to the present invention, wherein a source node in a network which operates according to a reactive routing protocol will update routes based upon predetermined events. The inventive methods and apparatus can be implemented in networks which use source routing as well as networks which use distance vector routing. Moreover, in accordance with certain embodiments a node which has a cached route to the destination node can provide the source node with an updated route.

Accordingly, it is an objective of the present invention to allow reactive ad-hoc routing protocols to determine whether more optimal routes exist between the source node and the destination node.

It is another objective of the present invention to provide means for a source node in a network using reactive routing protocols, upon the occurrence of a predetermined event, to determine whether more optimal routes exist to the destination node.

It is also an objective of the present invention to provide means for an intermediate node to use a cached route for informing a source node whether a more optimal route exists to the destination node.

In accordance with one aspect of the present invention, the foregoing and other objects are achieved by a method and/or an apparatus in an ad-hoc network which uses a reactive routing protocol, for updating a route between a source node and a destination node. The source node determines whether a predetermined event has occurred. If the predetermined event has occurred a request for updated route message is broadcast. The request for updated route message is received at a neighbor node. The neighbor node determines whether it is the destination node. If the neighbor node is the destination node a reply message is generated and sent from the neighbor node.

BRIEF DESCRIPTION OF THE DRAWINGS

The objects and advantages of the invention will be understood by reading the following detailed description in conjunction with the drawings in which.

DETAILED DESCRIPTION

The present invention is directed to route updating in ad-hoc networks. More specifically, the present invention is directed to updating routes in reactive ad-hoc networks.

Although the following discussion describes the present invention in terms of an implementation that employs route updating in ad-hoc networks, one skilled in the art will recognize that the present invention could be applied to fixed networks, or any type of network including wireline and wireless networks.

Figure 4:
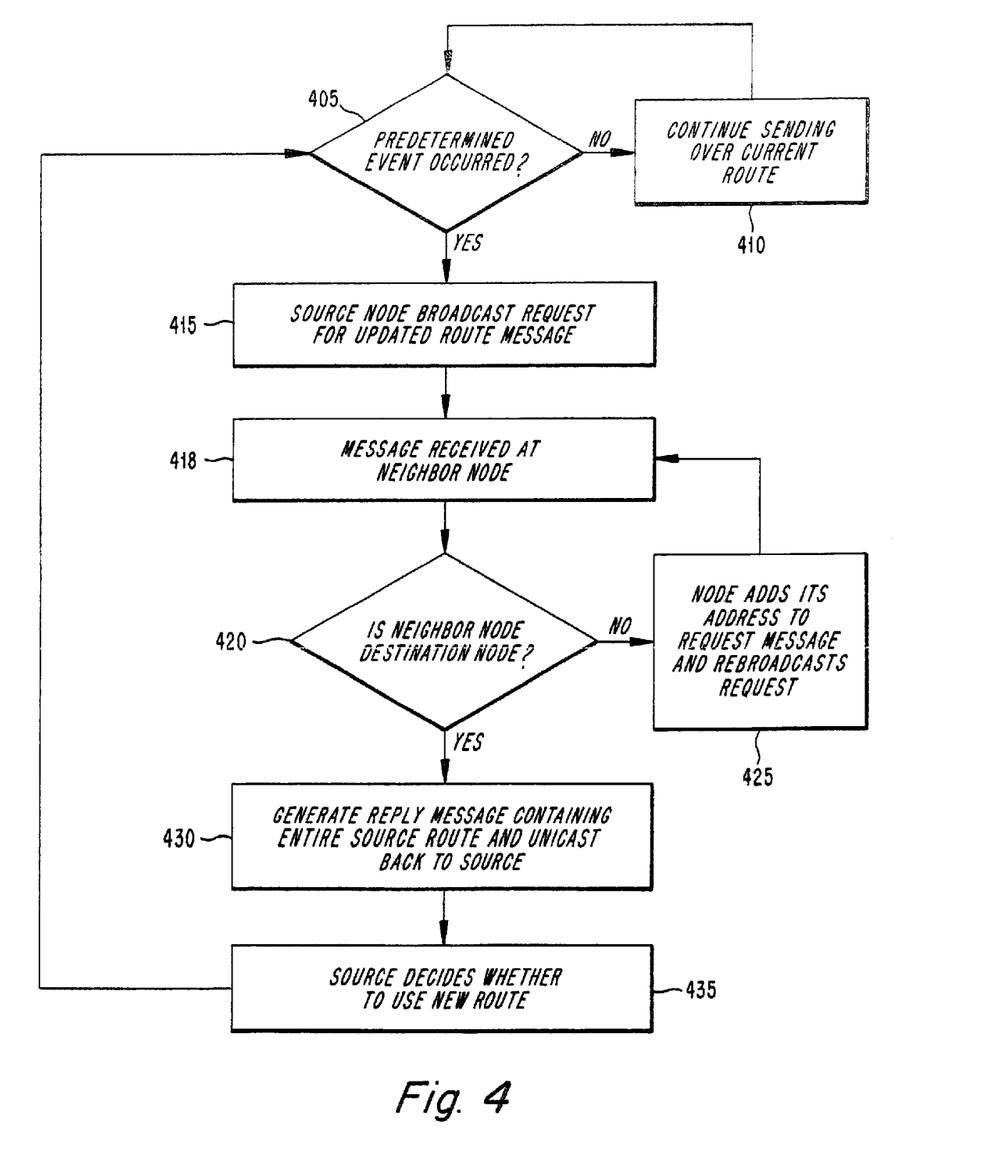
FIG. 4 illustrates an exemplary method for route updating in a network which implements source routing.

FIG. 4 illustrates an exemplary method for updating the route between a source node and a destination node in a network which implements source routing. In step 405 the source node determines whether a predetermined event has occurred. The predetermined event could be the expiration of a predetermined time period. For example, each node which has an active route will periodically broadcast an request for updated route message to find a new and better route between the source node and the destination node. The period can be set such that the source node does not request an updated route before a current request for updated route has traveled through the network. Further, one skilled in the art will recognize that the time period could be set to a large value which could be incrementally shortened based upon how often routes to the destination node are broken.

Another predetermined event can be based upon traffic load. If the traffic load along the route between the source node and the destination node reaches a predetermined level where the throughput along the route falls below a predetermined threshold value, the source node will trigger a request for updated route. Another exemplary predetermined event is the delay along the route. If the delay along the route between the source node and the destination node exceeds a predetermined threshold value then the source node will trigger a request for updated route.

A high hop count, i.e., the number of intermediate nodes between the source node and the destination node, could also be used to trigger a request for updated route request. If the number of hops in the original route between the source node and the destination node has more than a certain number of hops, the source node will trigger a request for updated route while the source node begins using the original route.

Another predetermined event is based upon hot spots in the route between the source node and the destination node. Hot spots occur when to many different routes flow through the same node. Accordingly, if the number of routes which flow through a node is above a predetermined threshold level the source node could trigger a request for updated route. In order to implement the hot spot predetermined event, the intermediate nodes would inform the source node about the hot spot so that the source node could trigger the request for updated route.

If the predetermined event has not occurred, in accordance with the "No" path out of decision step 405, then the source node continues to send packets over its current route in accordance with step 410. The method then returns to step 405 to determine if a predetermined event has occurred. If a predetermined event has occurred, in accordance with the "Yes" path out of decision step 405, then the source node broadcasts a request for updated route message in accordance with step 415. So that the request for updated route message can be distinguished from ordinary requests in the network, the source node can place a one bit update flag in the header of the request message. Alternatively, the source node can distinguish these messages using a new message type for the update request where the new message type code is placed in the routing header. As will be described in more detail below in connection with FIG. 5, the source node may not necessarily want to receive a cached route from an intermediate node between the source node and the destination node. Accordingly, by distinguishing the request for updated route message from other request for route messages ensures that cached routes will not be returned to the source node. Of course, one skilled in the art will recognize that it is only necessary to distinguish request for updated route messages from other messages if the intermediate nodes are allowed to cache routes.

In step 418 the request for updated route message is received at a neighbor node. In step 420 the neighboring node determines whether it is the destination node. If the node is not the destination node, in accordance with the "No" path out of decision step 420, then the node adds its address to the request for updated route message and rebroadcasts the message to neighboring nodes in accordance with step 425. The method then returns to steps 418 and 425 for each neighboring node to determine whether it is the destination node.

If the node which received the message is the destination node then, in accordance with the "Yes" path out of decision step 420, the node generates a unicast reply message containing the entire route between the source node and the destination node in accordance with step 430. In step 435 the source node decides whether it wants to use the new route or continue transmitting over the currently active route. The source node could make this decision based upon the number of hops in the route. Alternatively, the reply message can collect information about network conditions on the way back to the source node and the source node would use the collected information to determine which route to use. The method then returns to step 405 for the source node to determine whether a predetermined event has occurred.

Figure 5:
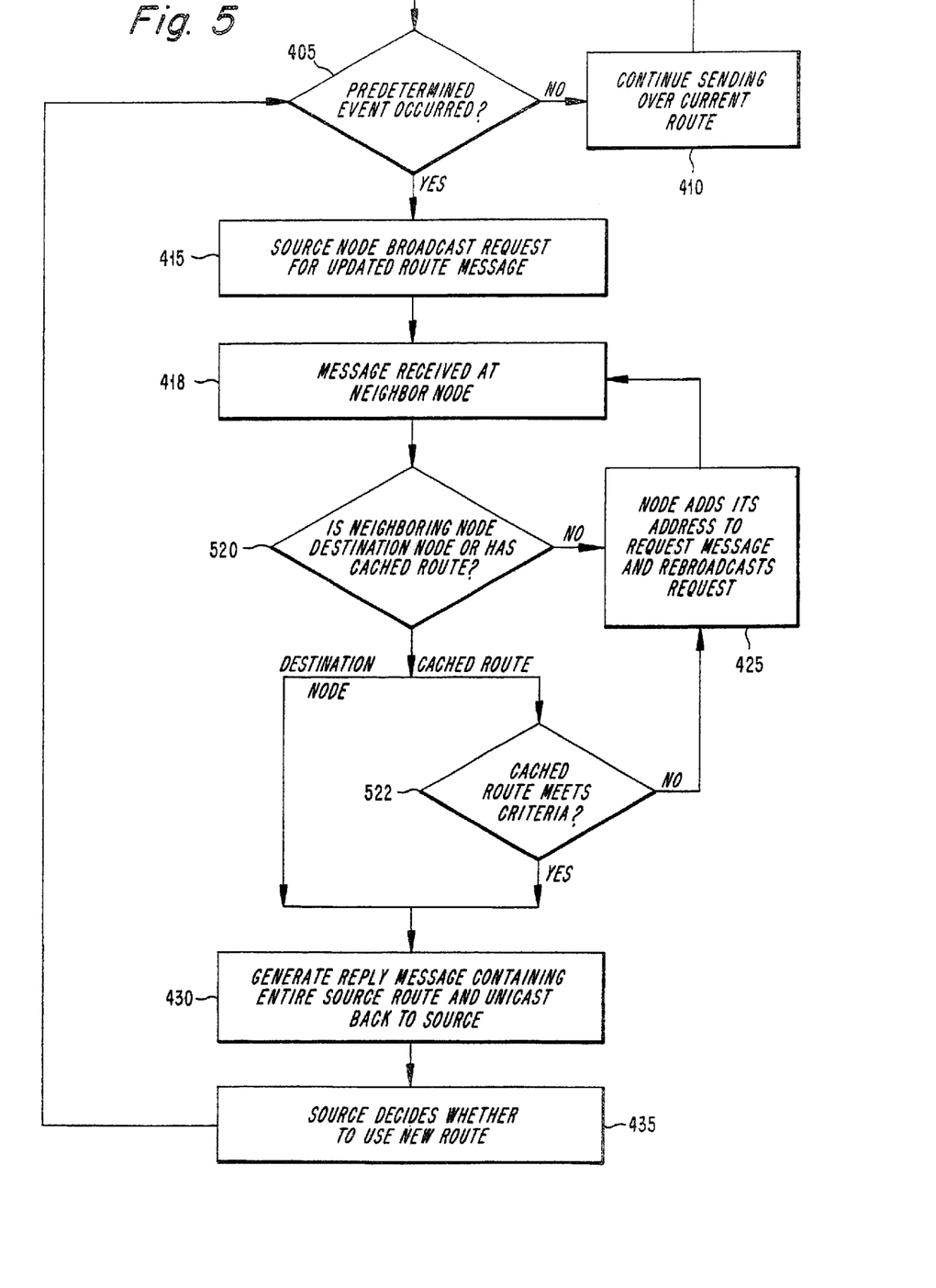
FIG. 5 illustrates an exemplary method for route updating using cached routes in intermediate nodes in a network which implements source routing.

FIG. 5 illustrates an exemplary method for implementing the inventive source routing updating scheme using cached routes in intermediate nodes. One skilled in the art will recognize that even in source routing intermediate nodes may cache routes in a routing table in the node. However, since the update request is used to determine new routes based on current network conditions it may not be desirable to use these cached routes. If the source node can be assured that the cached routes have a certain degree of reliability, i.e., the route is relatively "fresh", then cached routes can be used in the inventive route updating scheme. One method for implementing cached routes is to store a time value when the route is created or updated. A node which is not the destination node would only reply with the cached route if the cached route has been created or updated within a predetermined time period. Alternatively, the time period can be stored when the route was last used to carry packets. In this case the cached route would only be sent back to the source node if it has been less than a predetermined time period since the route was last used.

Accordingly, in FIG. 5 step 420 is replaced by step 520. In step 520 it is determined whether the node which received the request for updated route message is the destination node or has a cached route to the destination node. If the node is not the destination node and does not have a cached route to the destination node, in accordance with the "No" path out of decision step 520, the node adds its address to the request for updated route message and rebroadcasts the message in accordance with step 425. If the node is not the destination node but the node has a cached route to the destination node, in accordance with the "Cached Route" path out of decision block 520, then it is determined whether the cached route meets certain criteria in accordance with step 522. These criteria are described above and either of the methods for determining whether the cached route is acceptable could be implemented in step 522. If it is determined that the cached route does not meet the criteria, in accordance with the "No" path out of decision step 522, then the node adds its address to the request for updated route message and rebroadcasts the message in accordance with step 425.

If it is determined either that the node has a cached route which meets the criteria, in accordance with the "Yes" path out of decision step 522, or it is determined that the node is the destination node, in accordance with the "Destination node" path out of decision step 520, then the node will generate a unicast reply message containing the entire route from the source node to the destination node in accordance with step 430. In step 435 the source node receives the reply message and determines whether to use the new route.

Figure 6:
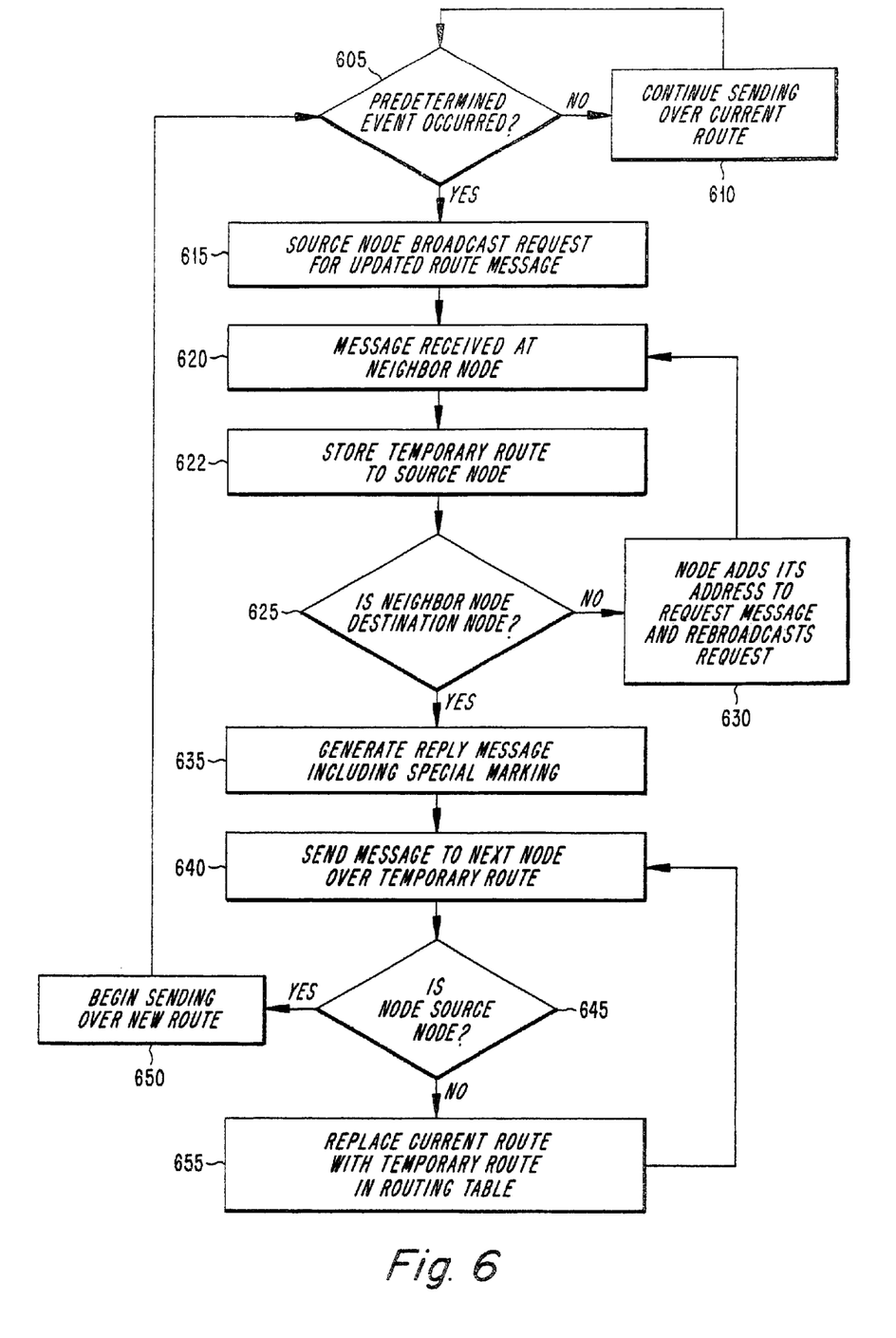
FIG. 6 illustrates an exemplary method for route updating in a network which uses distance vector routing.

FIG. 6 illustrates an exemplary method for updating the route between a source node and a destination node in a network which implements distance vector routing. In step 605 the source node determines whether the predetermined event has occurred. If the predetermined event has not occurred, in accordance with the "No" path out of decision step 605, then the source node continues to send packets over its current route in accordance with step 610.

If the predetermined event has occurred, in accordance with the "Yes" path out of decision step 605, then the source node broadcasts a request for updated route message in accordance with step 615. As described above, so that the updated route message can be distinguished from ordinary requests in the network, the source node can place a one bit update flag in the header of the request message. Alternatively, the source node can distinguish these messages using a new message type for the update request where the new message type code is placed in the routing header.

In step 620 a node which is a neighbor of the source node receives the request for updated route message. In step 622 the node stores a temporary route back to the source in a table separate from the nodes normal routing table. The temporary route is stored in a separate table to ensure that the route is not activated until the reply message has been sent from the destination node. Alternatively, the temporary route can be stored in the same table as the active route with the temporary route being distinguished by a special marker. Another alternative is to place the temporary route without a special marker in the same routing table as the active route and let the node activate the temporary route for use.

In step 625 the node which received the broadcast message determines whether it is the destination node. If the node is not the destination node, in accordance with the "No" path out of decision step 625, then the node adds its address to the message and rebroadcasts the request for updated route message to neighboring nodes in accordance with step 630. Alternatively, if the protocol provides another mechanism for providing address information to neighbor nodes, then it is not necessary for the node to add its address to the message. In accordance with the path from step 630 to step 620, each neighboring node determines whether it is the destination node.

If the node determine that it is the destination node, in accordance with the "Yes" path out of decision step 625, then the node generates the reply update message including a either a one bit update flag in the reply header or a new message type with a new message type code in the routing header. In step 640 the reply update message is sent back over the temporary route from the destination node to the source node. As the reply update message travels along the route each node determines whether it is the source node in accordance with step 645. If the node is the source node, in accordance with the "Yes" path out of decision step 645, then the node can begin sending packets over the new route in accordance with step 650. The method returns to step 605 and the source node determines whether the predetermined event has occurred.

If the node is not the source node, in accordance with the "No" path out of decision step 645, then the node replaces the current route with the updated temporary route in the node's routing table in accordance with step 655. The reply message will activate both the forward and backwards direction of the temporary route in the node. After the node has replaced the active route with the temporary route, the node will send the message to the next node in the temporary route. This continues until the reply message reaches the source node. Alternatively, if the temporary route is not stored in a separate routing table, then step 655 would merely activate the forward and backward directions of the temporary route.

Figure 7:
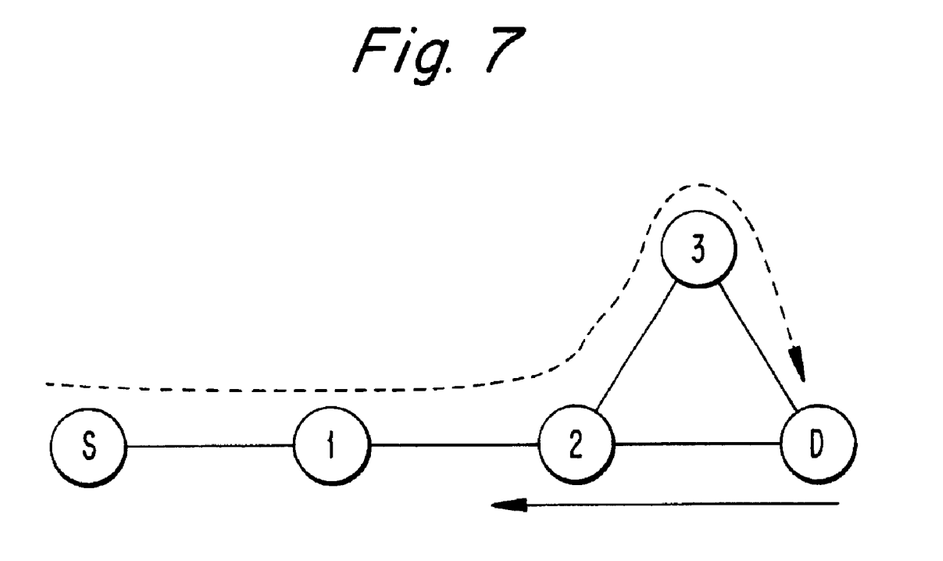
FIG. 7 illustrates an exemplary network for implementing the inventive distance vector reactive route updating.

As described above, in step 655 the intermediate nodes do not replace the current route in the routing table with the temporary route until the node receives the reply update message as it travels from the destination node to the source node. This is to ensure that the route change does not interfere with data packets in transit. For example, FIG. 7 illustrates an exemplary ad-hoc network including a source node S, intermediate nodes 1–3 and destination node D. The dashed line illustrates the current route between the source node and the destination node. The current route begins at the source node S, traverses intermediate nodes 1–3 and terminates at the destination node D.

Assume now that a request for updated route message traveled from the source node S through intermediate nodes 1 and 2 and terminated at destination node D. Intermediate node 2 would continue to send packets from the source node to node 3 until the intermediate node 2 received the update reply message from the destination node D.

Figure 8:
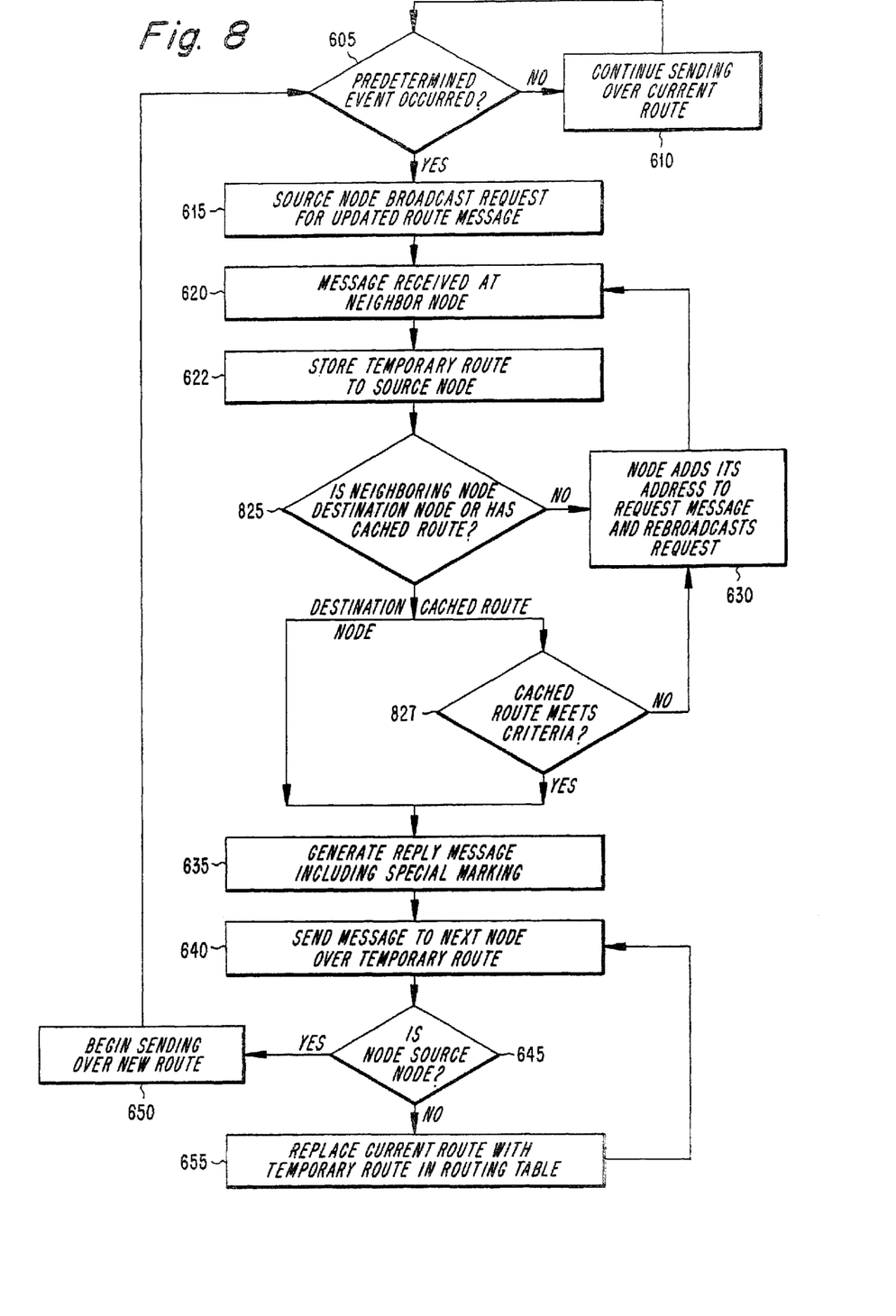
FIG. 8 illustrates an exemplary method for route updating using cached routes in intermediate nodes in a network which implements distance vector routing.

FIG. 8 illustrates an exemplary method for implementing the inventive distance vector route updating scheme using cached routes in intermediate nodes. In FIG. 8 step 625 is replaced by step 825. In step 825 it is determined whether the node which received the request for updated route message is the destination node or has a cached route to the destination node. If the node is not the destination node and does not have a cached route to the destination node, in accordance with the "No" path out of decision step 825, the node adds its address to the request for updated route message and rebroadcasts the message in accordance with step 630. If the node is not the destination node but the node has a cached route to the destination node, in accordance with the "Cached Route" path out of decision block 825, then it is determined whether the cached route meets certain criteria in accordance with step 827. These criteria are same criteria described above with respect to FIG. 5 and either of the methods for determining whether the cached route is acceptable could be implemented in step 827. If it is determined that the cached route does not meet the criteria, in accordance with the "No" path out of decision step 827, then the node adds its address to the request for updated route message and rebroadcasts the message in accordance with step 630.

If it is determined either that the node has a cached route which meets the criteria, in accordance with the "Yes" path out of decision step 827, or it is determined that the node is the destination node, in accordance with the "Destination node" path out of decision step 825, then the node will generate a unicast reply message including a special marking indicating that it is a reply message in accordance with step 635. The remainder of the method of FIG. 8 operates in a similar manner to the method of FIG. 6.

By providing a mechanism for updating routes in an ad-hoc network using reactive routing protocols, more efficient routes can be discovered. Further, reactive routing using the inventive route updating mechanism requires less signaling and hence less load on the network than proactive routing protocols. The techniques and hardware implementations associated with route discovery described above, provide a simple, efficient, and precise way of identifying alternate routes between a source node and destination node. Consequently, the present invention conserves valuable network resources as compared with prior techniques.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In an ad-hoc network, a method for updating a route between a source node and a destination node, the method comprising the steps of:

exchanging information between the source node and the destination node over a first route;

determining, in the source node, whether a predetermined event has occurred;

broadcasting a request for updated route message if the predetermined event has occurred;

receiving the request for updated route message at a neighbor node;

determining whether the neighbor node is the destination node; and generating and sending a reply message from the neighbor node if the neighbor node is the destination node, wherein the network uses a reactive routing protocol and wherein the source node and destination node continue to use the first route to exchange information until another route is established.

2. The method of claim 1, wherein the network operates in accordance with source routing, and the step of generating and sending a reply message further comprises the step of:

inserting the entire route between the source node and the destination node in the reply message.

3. The method of claim 2, further comprising the steps of:

forwarding the reply message through intermediate nodes to the source node; and inserting information about network condition into the reply message at the intermediate nodes.

4. The method of claim 3, wherein the source node determines whether to use the first route or the route in the reply message based on the network condition information.

5. The method of claim 1, wherein the network operates in accordance with distance vector routing, the method further comprising the step of:

storing temporary route information from the neighbor node to the source node.

6. The method of claim 5, further comprising the steps of:
receiving the reply message at a node;
determining whether the node is the source node;
replacing the first route between the source node and the destination node with the temporary route; and
sending messages over the temporary route if the node is the source node.

7. The method of claim 1, further comprising the step of:
determining whether the neighbor node has a cached route to the destination node; and
generating and sending a reply message from the neighbor node if the neighbor node has a cached route to the destination node which meets predetermined criteria.

8. The method of claim 7, further comprising the step of:
storing a time value when a route is created or updated, wherein the predetermined criteria is met if the cached route has been created or updated less than a predetermined time prior to reception of the request for updated route message.

9. The method of claim 7, further comprising the step of:
storing a time value when a route was last used to carry packets, wherein the predetermined criteria is met if the cached route was last used to carry packets less than a predetermined time prior to reception of the request for updated route message.

10. The method of claim 1, wherein the ad-hoc network is a Bluetooth scatternet.

11. The method of claim 1, wherein the predetermined event is the expiration of a predetermined time period.

12. The method of claim 11, wherein the predetermined time period is set to a time period longer than the sum of the time it takes for the request for updated route message to reach the destination node and the time it take the reply message to reach the source node.

13. The method of claim 11, wherein the predetermined time period is set to a first value which is incrementally shortened based on how often routes to the destination node are broken.

14. The method of claim 1, wherein the predetermined event is selected from the group of predetermined events consisting of:

traffic load along the first route between the source node and the destination node, amount of delay along the first route between the source node and the destination node, hop count along the first route between the source node and destination node, and hot spots along the first route between the source node and destination node.

15. In an ad-hoc network, an arrangement for updating a route between a source node and a destination node, the arrangement comprising:

a source node comprising:
means for exchanging information between the source node and the destination node over a first route;
means for determining whether a predetermined event has occurred; and
means for broadcasting a request for updated route message if the predetermined event has occurred;

a neighbor node comprising:
means for receiving the request for updated route message;
means for determining whether the neighbor node is the destination node; and
means for generating and sending a reply message from the neighbor node if the neighbor node is the destination node, wherein the network uses a reactive routing protocol and wherein the source node and destination node continue to use the first route to exchange information until another route is established.

16. The arrangement of claim 15, wherein the network operates in accordance with source routing, and the means for generating and sending a reply message further comprises:

means inserting the entire route between the source node and the destination node in the reply message.

17. The arrangement of claim 16, further comprising:
intermediate nodes comprising:
means for forwarding the reply message to the source node; and
means for inserting information about network condition into the reply message.

18. The arrangement of claim 17, wherein the source node further comprises:

means for determining whether to use the first route or the route in the reply message based on the network condition information.

19. The arrangement of claim 15, wherein the network operates in accordance with distance vector routing, wherein the neighbor node further comprises:

means for storing a temporary route from the neighbor node to the source node.

20. The arrangement of claim 19, further comprising:

means for receiving the reply message at a node;

means for determining whether the node is the source node;

means for replacing the first route between the source node and the destination node with the temporary route; and means for sending messages over the temporary route if the node is the source node.

21. The arrangement of claim 15, wherein the neighbor node further comprises:

means for determining whether the neighbor node has a cached route to the destination node; and means for generating and sending a reply message from the neighbor node if the neighbor node has a cached route to the destination node which meets predetermined criteria.

22. The arrangement of claim 21, wherein the neighbor node further comprises:

means for storing a time value when a route is created or updated, wherein the predetermined criteria is met if the cached route has been created or updated less than a predetermined time prior to reception of the request for updated route message.

23. The arrangement of claim 21, wherein the neighbor node further comprises:

means for storing a time value when a route was last used to carry packets, wherein the predetermined criteria is met if the cached route was last used to carry packets less than a predetermined time prior to reception of the request for updated route message.

24. The arrangement of claim 15, wherein the ad-hoc network is a Bluetooth scatternet.

25. The arrangement of claim 15, wherein the predetermined event is the expiration of a predetermined time period.

26. The arrangement of claim 25, wherein the predetermined time period is set to a time period longer than the sum of the time it takes for the request for updated route message to reach the destination node and the time it take the reply message to reach the source node.

27. The arrangement of claim 25, wherein the predetermined time period is set to a first value which is incrementally shortened based on how often routes to the destination node are broken.

28. The arrangement of claim 15, wherein the predetermined event is selected from the group of predetermined events consisting of:

traffic load along the first route between the source node and the destination node, amount of delay along the first route between the source node and the destination node, hop count along the first route between the source node and destination node, and hot spots along the first route between the source node and destination node.

* * * * *